(12) United States Patent
Kim et al.

(10) Patent No.: US 12,340,373 B2
(45) Date of Patent: Jun. 24, 2025

(54) METHOD AND SYSTEM FOR DETECTING ABNORMAL TRANSACTION BETWEEN COMPUTING DEVICES IN A COMMUNICATION NETWORK USING VALID TRANSACTION PATTERN

(71) Applicant: KakaoBank Corp., Seongnam-si (KR)

(72) Inventors: Hyeon Seung Kim, Seongnam-si (KR); Jang Hyun Han, Seongnam-si (KR); Doo Hwan Im, Seongnam-si (KR)

(73) Assignee: Kakaobank Corp., Seongnam-si (KR)

( * ) Notice: Subject to any disclaimer, the term of this patent is extended or adjusted under 35 U.S.C. 154(b) by 333 days.

(21) Appl. No.: 17/825,470

(22) Filed: May 26, 2022

(65) Prior Publication Data
US 2022/0391912 A1    Dec. 8, 2022

(30) Foreign Application Priority Data
Jun. 3, 2021  (KR) .......................... 10-2021-0071895

(51) Int. Cl.
*G06Q 20/40*       (2012.01)
(52) U.S. Cl.
CPC ....... *G06Q 20/4016* (2013.01); *G06Q 20/405* (2013.01); *G06Q 20/407* (2013.01)
(58) Field of Classification Search
None
See application file for complete search history.

(56) References Cited

U.S. PATENT DOCUMENTS

| | | | |
|---|---|---|---|
| 6,119,103 A | | 9/2000 | Basch et al. |
| 10,755,281 B1 | * | 8/2020 | Yip et al. |

(Continued)

FOREIGN PATENT DOCUMENTS

| | | |
|---|---|---|
| KR | 10-2011-0048825 A | 5/2011 |
| KR | 10-1814989 B1 | 1/2018 |

(Continued)

OTHER PUBLICATIONS

Office Action of the corresponding Korean Application No. 10-2021-0071895, dated Jan. 29, 2023.

(Continued)

*Primary Examiner* — Neha Patel
*Assistant Examiner* — Yin Y Choi
(74) *Attorney, Agent, or Firm* — Knobbe, Martens, Olson, & Bear, LLP

(57) ABSTRACT

The described technology relates to a method for detecting abnormal transaction data between computing devices in a communication network using valid transaction patterns and a server for performing the same. In one aspect, the method includes receiving, at a data collection processor, from an institution server computer, a plurality of pieces of transaction data communicated between two or more of the plurality of user devices, and determining, at a data processor, at least one piece of valid transaction data from the plurality of pieces of transaction data. The method may also include generating, at the data collection processor, a valid transaction pattern based on the determined valid transaction data. The method may further include detecting, at an abnormal transaction detection processor, an existence of an abnormal transaction data between two or more of the plurality of user devices based on the generated valid transaction pattern.

16 Claims, 12 Drawing Sheets

(56) References Cited

U.S. PATENT DOCUMENTS

2019/0295089 A1* 9/2019 Jia et al.
2020/0380571 A1* 12/2020 Ramakrishnan et al.
2021/0035106 A1 2/2021 Lin et al.
2021/0073838 A1* 3/2021 Verma et al.
2021/0157786 A1* 5/2021 Louizos et al.
2022/0245643 A1* 8/2022 Venkatasubramaniam et al.

FOREIGN PATENT DOCUMENTS

| | | |
|---|---|---|
| KR | 10-1834260 B1 | 3/2018 |
| KR | 10-2058697 B1 | 12/2019 |
| KR | 10-2243341 B1 | 4/2021 |

OTHER PUBLICATIONS

Mbunge et al., "Fraud Detection in E-Transactions using Deep Neural Networks—A Case of Financial Institutions in Zimbabwe", International Journal of Science and Research, Sep. 30, 2017, vol. 6, pp. 1036-1041.
Office Communication in SG Application No. 10202250023K dated Jun. 28, 2024 in 10 pages.

\* cited by examiner

Fig. 5
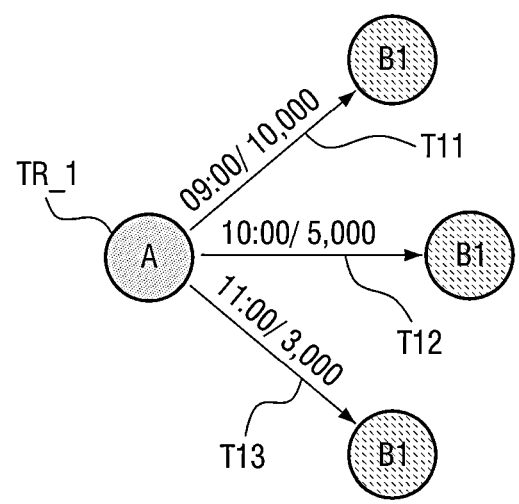
<a1>
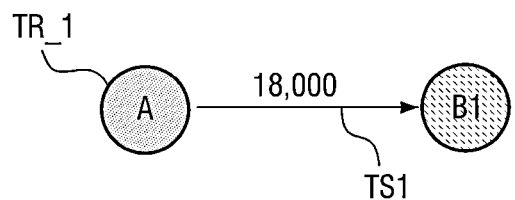
<a2>

Fig. 6
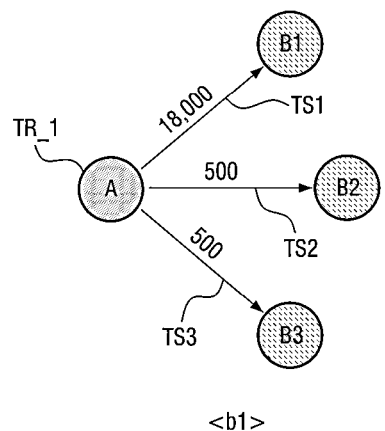
<b1>
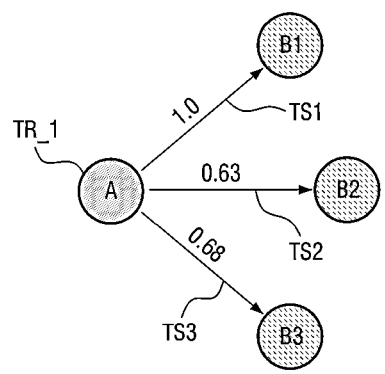
<b2>
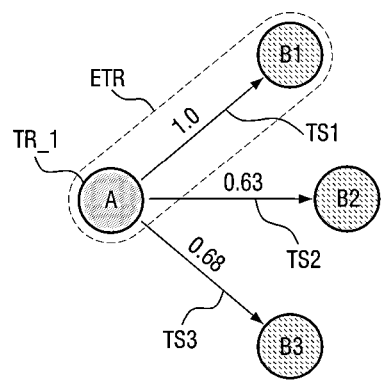
<b3>

Fig. 8
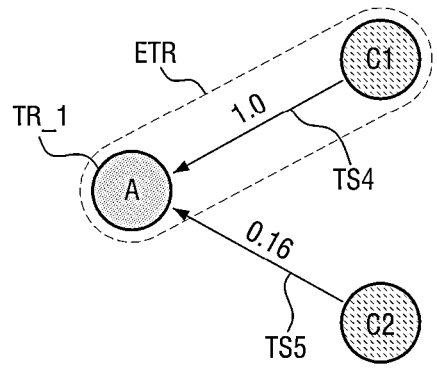
Fig. 9
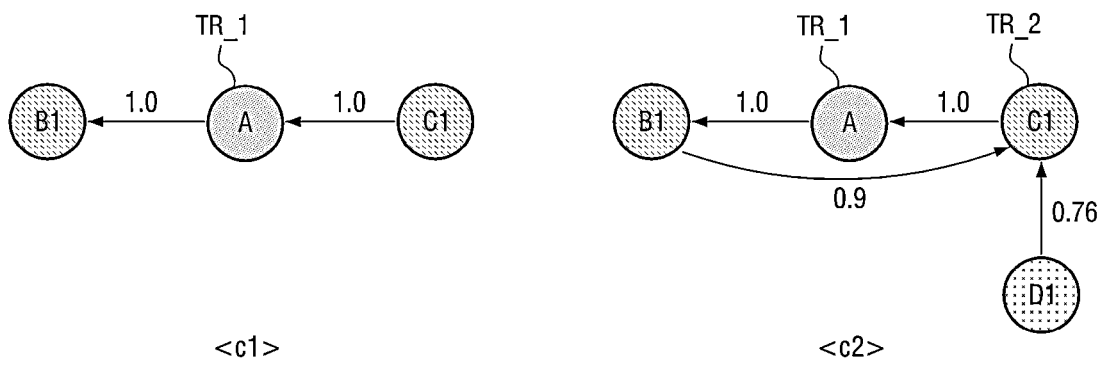
<c1>                <c2>
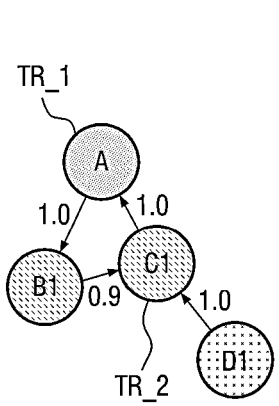   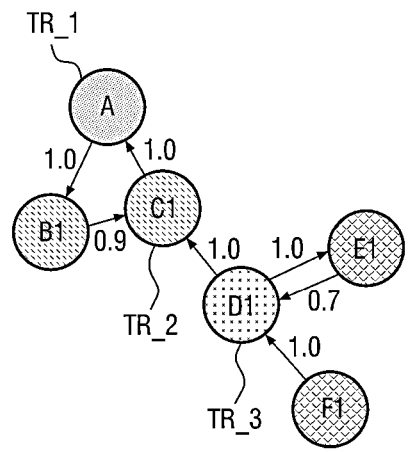
<c3>                <c4>

Fig. 11
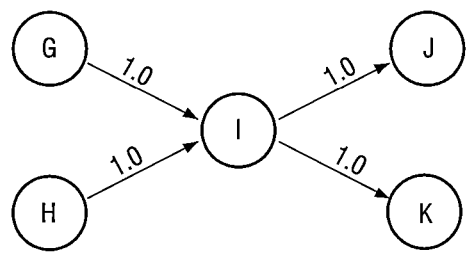
<d1>
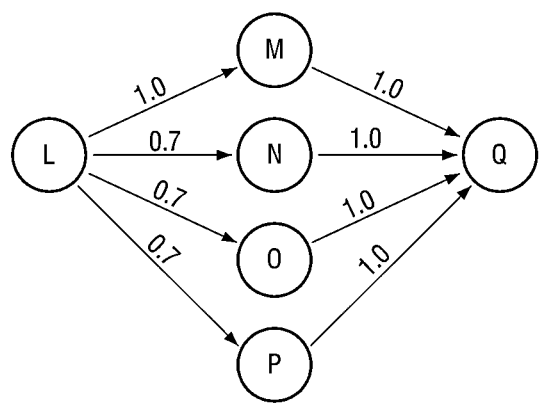
<d2>
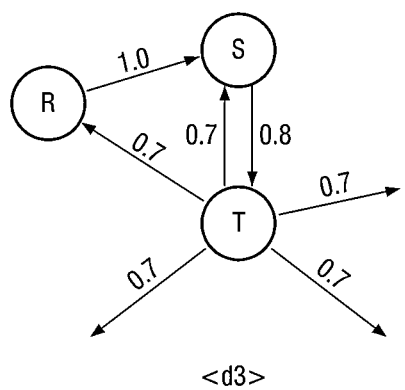
<d3>

Fig. 12
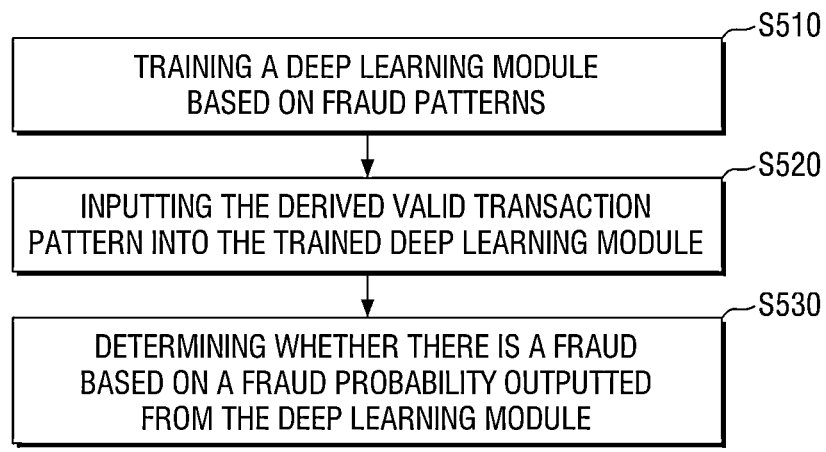
Fig. 13
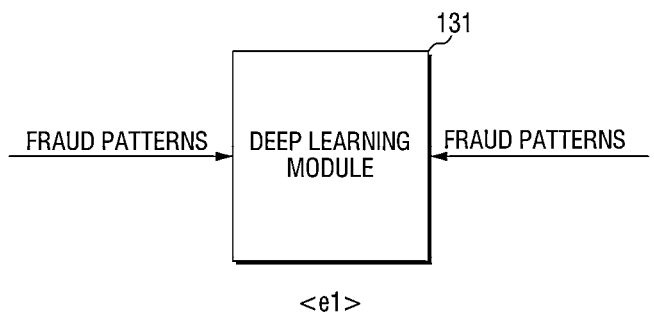
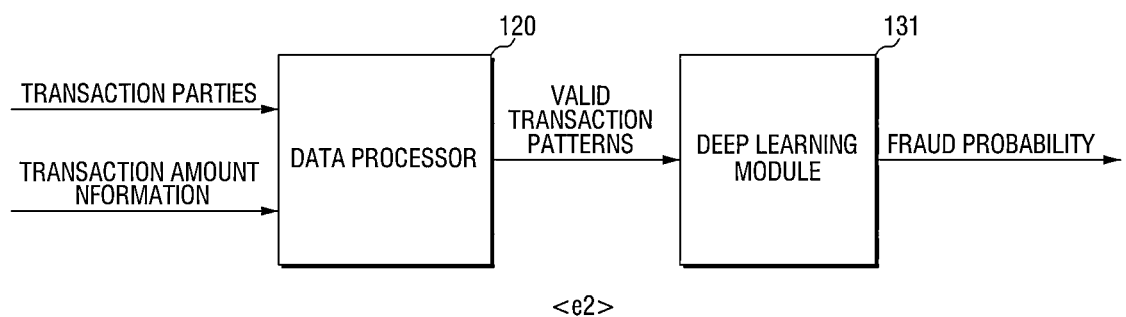

METHOD AND SYSTEM FOR DETECTING ABNORMAL TRANSACTION BETWEEN COMPUTING DEVICES IN A COMMUNICATION NETWORK USING VALID TRANSACTION PATTERN

CROSS-REFERENCE TO RELATED APPLICATION

This application claims priority from Korean Patent Application No. 10-2021-0071895 filed on Jun. 3, 2021 in the Korean Intellectual Property Office, and all the benefits accruing therefrom under 35 U.S.C. 119, the contents of which in their entirety are herein incorporated by reference.

BACKGROUND

Field

The described technology relates to a method and system for detecting an abnormal transaction data (e.g., fraudulent activity) between two more user devices in a communication network using valid transaction patterns. Specifically, the described technology relates to a method and system for detecting an abnormal transaction data for determining whether there is an abnormal transaction data such as a fraudulent activity by deriving valid transactors based on the transaction details of particular transactors and using valid transaction patterns derived by expanding them.

Description of the Related Technology

What is set forth in this section merely provides background information on the embodiment of the disclosures and does not constitute the prior art.

As channels providing financial transactions have diversified, fraudulent use of non-face-to-face transactions is increasing at a rapid rate. In particular, as financial institutions or electronic financial services providers provide financial products and services through computing devices, there is an increasing number of financial transactions that are conducted online, without users having to face employees of the financial institutions or electronic financial services providers directly. Accordingly, the importance of methods that make it possible to detect and predict fraudulent use in non-face-to-face transactions is increasing day by day.

To this end, each financial institution is currently introducing and developing a fraud detection system (FDSs) in order to detect financial frauds.

SUMMARY

One aspect is a method and system for detecting fraud that can derive valid transaction patterns obtained from particular transactors by identifying valid transactors for particular transactors from a plurality of pieces of transaction data included in big data and identifying additional valid transactors for the identified valid transactors.

Another aspect is a method and system for detecting fraud that can detect whether there is a fraud by comparing a valid transaction pattern derived based on the transaction data of a particular transactor with a preset fraud pattern.

Another aspect is a method and system for detecting fraud that can determine whether there is a fraud by utilizing a pre-trained deep learning module that outputs a fraud probability based on the valid transaction pattern of a particular transactor.

The objects of the described technology are not limited to those mentioned above, and other objects and advantages of the described technology that have not been mentioned can be understood by the following description, and will be more clearly understood by embodiments of the disclosure In addition, it will be readily appreciated that the objects and advantages of the described technology can be realized by the means and combinations thereof set forth in the claims.

A method of detecting fraud in accordance with one embodiment of the described technology includes collecting a plurality of pieces of transaction data on transfer transactions, determining at least one piece of valid transaction data out of the plurality of pieces of transaction data, generating a valid transaction pattern based on the determined valid transaction data, and determining whether a fraud occurs based on the valid transaction pattern.

Further, according to the method of detecting fraud, the plurality of pieces of transaction data may include first transaction data including first personal name data and first transaction amount data associated with the first personal name data, and the step of determining the valid transaction data may include generating a first transaction score based on the first transaction amount data, and determining the first transaction data as first valid transaction data if the first transaction score is greater than or equal to a predetermined reference value.

In addition, according to the method of detecting fraud, the generating a first transaction score may include determining largest amount data out of transaction amount data associated with the first personal name data as first maximum transaction amount data, and generating the first transaction score by using the first maximum transaction amount data and the first transaction amount data.

Furthermore, according to the method of detecting fraud, the first transaction score may be derived by the following <Equation 1>:

$$Ts1 = T1/T\max \qquad \text{<Equation 1>}$$

where $Ts1$ is the first transaction score, $T1$ is the first transaction amount data, and $Tmax$ is the first maximum transaction amount data.

Moreover, according to the method of detecting fraud, the first transaction score may be derived by the following <Equation 2>:

$$Ts1 = (\log(T1))/(\log(T\max)) \qquad \text{<Equation 2>}$$

where $Ts1$ is the first transaction score, $T1$ is the first transaction amount data, and $Tmax$ is the first maximum transaction amount data.

Further, according to the method of detecting fraud, the first personal name data may include data on a first sender and a first recipient of the first transaction data, and the first transaction amount data may correspond to a cumulative total of amounts transferred by the first sender to the first recipient.

In addition, according to the method of detecting fraud, the step of generating the valid transaction pattern may include determining a first transactor, determining at least one transaction that satisfies a predetermined criterion out of first transaction data associated with the first transactor as first valid transaction data, and determining a second transactor that is associated with the first valid transaction data and that is different from the first transactor.

Furthermore, according to the method of detecting fraud, the step of generating the valid transaction pattern may further include determining at least one that satisfies the predetermined criterion out of second transaction data associated with the second transactor as second valid transaction data, and determining a third transactor that is associated with the second valid transaction data and that is different from the second transactor.

Moreover, according to the method of detecting fraud, the valid transaction pattern may include a pattern schematized using the first and second valid transaction data.

Further, according to the method of detecting fraud, the step of determining whether a fraud occurs may include determining whether a fraud occurs by comparing the valid transaction pattern with a predetermined fraud pattern.

In addition, according to the method of detecting fraud, the step of determining whether a fraud occurs may include deriving a probability that a fraud will occur with respect to the valid transaction pattern by using a pre-trained deep learning module, based on the valid transaction pattern, and may further includes a step of providing a notification to a preset manager terminal if the probability that a fraud will occur is higher than a predetermined reference value.

Furthermore, according to the method of detecting fraud, the deep learning module may include an input layer using data related to the valid transaction pattern as an input node, an output layer using the fraud probability as an output node, and one or more hidden layers arranged between the input layer and the output layer, wherein weights of nodes and edges between the input node and the output node may be updated by a training process of the deep learning module.

Moreover, according to the method of detecting fraud, the deep learning module may derive modeling data most similar to the inputted valid transaction pattern by using graphic neural networks, and output the fraud probability based on this.

On the other hand, a fraud detection server in accordance with one embodiment of the described technology includes a data collector configured to collect a plurality of pieces of transaction data on transfer transactions, a data processor configured to determine at least one piece of valid transaction data out of the plurality of pieces of transaction data and to generate a valid transaction pattern by using the valid transaction data determined, and a fraud determinator configured to determine whether a fraud occurs based on the valid transaction pattern.

The fraud detection method and server of the described technology can identify valid transactors for particular transactors from a plurality of pieces of transaction data based on predefined equations, and can automatically identify additional valid transactors for the identified valid transactors. Further, the described technology can schematize the confidence level between valid transactors so as to be recognized at a glance by deriving a relationship between transactors based on the transaction score between a particular transactor and the valid transactors.

In addition, the fraud detection method and server of the described technology can easily detect whether a fraud is included in the corresponding valid transaction pattern by comparing the schematized valid transaction pattern with the preset fraud pattern. Through this, the described technology can enhance the accuracy for detecting fraud and minimize the resources required for fraud detection by reducing the amount of computation required for detecting fraud.

Furthermore, the fraud detection method and server of the described technology can derive a fraud probability based on the valid transaction pattern of a particular transactor by using a deep learning module pre-trained using the training data for fraud patterns, and based on this, can quickly and easily determine whether a fraud is included in the fraud pattern.

Moreover, the fraud detection method and server of the described technology can enhance the accuracy of determination on frauds and improve the calculation processing speed of determination on frauds by using a deep learning module trained using graphic neural networks and a valid transaction pattern derived based on the transaction data of users.

In addition to what has been described, specific effects of the described technology will be described together while describing specific details for carrying out the described technology below.

Another aspect is a system for detecting an abnormal transaction data between computing devices in a communication network, the system comprising: a communication interface configured to establish a communication link with an institution server computer via a first communication network, the institution server computer configured to communicate data with a plurality of user devices via a second communication network; a data collection processor configured to receive, from the institution server computer, a plurality of pieces of transaction data communicated between two or more of the plurality of user devices, the plurality of pieces of transaction data comprising first transaction data including first personal name data and first transaction amount data associated with the first personal name data; a data processor configured to: determine at least one piece of valid transaction data from the plurality of pieces of transaction data by: generating a first transaction score based on the first transaction amount data, and determining the first transaction data as first valid transaction data in response to determining that the first transaction score is greater than or equal to a predetermined reference value; generate a valid transaction pattern based on the determined valid transaction data; and an abnormal transaction detection processor configured to detect an existence of an abnormal transaction data based on the generated valid transaction pattern.

In the above system, the data processor is configured to generate the valid transaction pattern based on the determined valid transaction data by: determining a first user device of the plurality of user devices associated with a first user, determining at least one transaction data transmitted by the first user device that satisfies a predetermined criterion from the first transaction data associated with the first user as first valid transaction data, and determining a second user device of the plurality of user devices associated with a second user that is different from the first user and is associated with the first valid transaction data, determining at least one transaction data transmitted by the second user device that satisfies the predetermined criterion from second transaction data associated with the second user as second valid transaction data, determining a third user device of the plurality of user devices associated with a third user that is associated with the second valid transaction data and is different from the first and second users, and generating a schematized pattern from the first valid transaction data and the second valid transaction data, wherein the valid transaction pattern comprises the schematized pattern, wherein the abnormal transaction data detection processor is configured to detect an existence of an abnormal transaction data in one or more of the first user device, the second user device, or the third user device based on the generated valid transaction pattern.

In the above system, to generate the first transaction score, the data processor is configured to: determine a largest transaction amount data from the first transaction amount data associated with the first personal name data as first maximum transaction amount data; and generate the first transaction score by using the first maximum transaction amount data and the first transaction amount data.

In the above system, the data processor is configured to generate the first transaction score using <Equation 1> expressed by:

$$Ts1 = \frac{T1}{Tmax}$$

where Ts1 is the first transaction score, T1 is the first transaction amount data, and Tmax is the first maximum transaction amount data.

In the above system, data processor is configured to generate the first transaction score using <Equation 2> expressed by:

$$Ts1 = \frac{\log(T1)}{\log(Tmax)}$$

where Ts1 is the first transaction score, T1 is the first transaction amount data, and Tmax is the first maximum transaction amount data.

In the above system, the abnormal transaction detection processor is configured to detect the existence of the abnormal transaction data by deriving an abnormal transaction data probability indicating a probability that an abnormal transaction data will occur with respect to the valid transaction pattern by using a pre-trained deep learning module, based on the valid transaction pattern.

In the above system, the deep learning module comprises: an input layer configured to use data related to the valid transaction pattern as an input node; an output layer configured to use the abnormal transaction data probability as an output node; and one or more hidden layers arranged between the input layer and the output layer, wherein the deep learning module is configured to update weights of nodes and edges between the input node and the output node.

Another aspect is a method of detecting an abnormal transaction data between computing devices in a communication network, the method comprising: establishing, at a communication interface, a communication link with an institution server computer via a first communication network, the institution server computer communicating data with a plurality of user devices via a second communication network; receiving, at a data collection processor, from the institution server computer, a plurality of pieces of transaction data communicated between two or more of the plurality of user devices, the plurality of pieces of transaction data comprising first transaction data including first personal name data and first transaction amount data associated with the first personal name data; determining, at a data processor, at least one piece of valid transaction data from the plurality of pieces of transaction data by: generating a first transaction score based on the first transaction amount data, and determining the first transaction data as first valid transaction data in response to determining that the first transaction score is greater than or equal to a predetermined reference value; generating, at the data processor, a valid transaction pattern based on the determined valid transaction data: and detecting, at an abnormal transaction detection processor, an existence of an abnormal transaction data in one or more of the first user device, the second user device, or the third user device based on the generated valid transaction pattern.

In the above method, generating the valid transaction pattern based on the determined valid transaction comprising: determining a first user device of the plurality of user devices associated with the first user, determining at least one transaction data transmitted by the first user device that satisfies a predetermined criterion from the first transaction data associated with the first user as first valid transaction data, and determining a second user device of the plurality of user devices associated with a second user that is different from the first user and is associated with the first valid transaction data, determining at least one transaction data transmitted by the second user device that satisfies the predetermined criterion from second transaction data associated with the second user as second valid transaction data, determining a third user device of the plurality of user devices associated with a third user that is associated with the second valid transaction data and is different from the first and second users, and generating a schematized pattern from the first valid transaction data and the second valid transaction data, wherein the valid transaction pattern comprises the schematized pattern, wherein detecting, at an abnormal transaction detection processor, an existence of an abnormal transaction data in one or more of the first user device, the second user device, or the third user device based on the generated valid transaction pattern.

In the above method, generating the first transaction score comprises: determining a largest transaction amount data from the first transaction amount data associated with the first personal name data as first maximum transaction amount data, and generating the first transaction score by using the first maximum transaction amount data and the first transaction amount data.

In the above method, the first transaction score is derived by <Equation 1> expressed by:

$$Ts1 = \frac{T1}{Tmax}$$

where Ts1 is the first transaction score, T1 is the first transaction amount data, and Tmax is the first maximum transaction amount data.

In the above method, the first transaction score is derived by <Equation 2> expressed by:

$$Ts1 = \frac{\log(T1)}{\log(Tmax)}$$

where Ts1 is the first transaction score, T1 is the first transaction amount data, and Tmax is the first maximum transaction amount data.

In the above method, the first personal name data comprises data of a first sender and a first recipient of the first transaction data, and wherein the first transaction amount data corresponds to a cumulative total of amounts transferred by the first sender to the first recipient.

In the above method, the existence of the abnormal transaction data is determined based on comparison of the valid transaction pattern and a predetermined abnormal transaction pattern.

The above method further comprises sending a notification to a preset manager terminal in response to determining that the abnormal transaction data exists.

In the above method, determining the existence of the abnormal transaction data comprises: deriving an abnormal transaction data probability indicating a probability that an abnormal transaction data will occur with respect to the valid transaction pattern by using a pre-trained deep learning module, based on the valid transaction pattern.

The above method further comprises sending a notification to a preset manager terminal in response to determining that the abnormal transaction data probability is higher than a predetermined reference value.

In the above method, the deep learning module comprises: an input layer using data related to the valid transaction pattern as an input node; an output layer using the abnormal transaction data probability as an output node; and one or more hidden layers arranged between the input layer and the output layer, wherein weights of nodes and edges between the input node and the output node are updated by a training process of the deep learning module.

In the above method, the deep learning module derives modeling data most similar to the inputted valid transaction pattern by using graphic neural networks, and outputs the abnormal transaction data probability based on the derived modeling data.

Another aspect is a non-transitory computer-readable recording medium storing instructions, when executed by one or more processors, configured to perform one or more of the above methods.

BRIEF DESCRIPTION OF THE DRAWINGS

FIGS. 5 and 6 are patterns schematically illustrating the process of FIG. 4.

FIG. 8 is a pattern schematically illustrating FIG. 7.

FIG. 9 is a diagram for illustratively describing a method of determining a valid transaction pattern in accordance with some embodiments of the disclosure.

FIG. 11 is a diagram for illustratively describing fraud patterns in accordance with some embodiments of the disclosure.

FIGS. 12 and 13 are views for describing a method of determining whether there is a fraud by using a deep learning module in a fraud detection method in accordance with another embodiment of the described technology.

DETAILED DESCRIPTION

Figure 1:
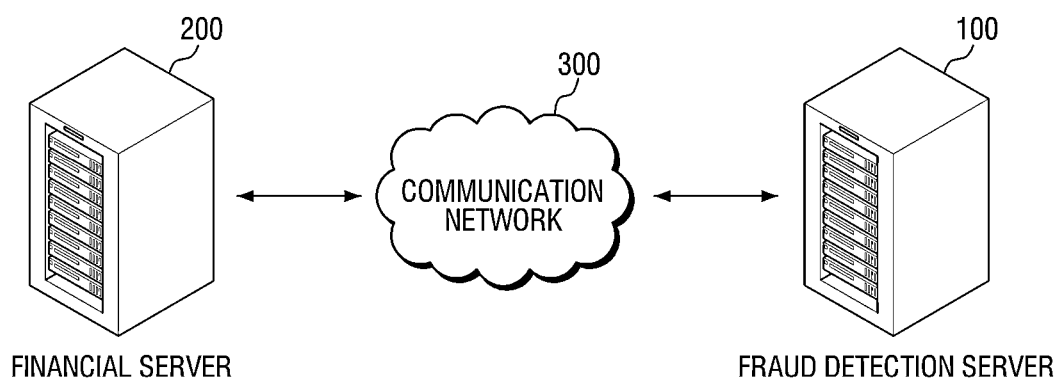
FIG. 1 is a diagram for describing a fraud detection system in accordance with some embodiments of the disclosure

In general, a fraud detection system (FDS) is a rule-based detection system that collects various pieces of data from payers, creates patterns, detects fraudulent payments that differ from the patterns, and blocks the payment routes. This system manages data on financial fraud cases collected through multiple channels by their types, and manages data on users' normal financial transactions by their users. In addition, the system determines whether financial transactions performed by users through communication networks fall within financial frauds, and blocks financial transactions if they fall within financial frauds.

However, in order to detect such frauds, it is necessary to analyze big data such as past transaction history and past incident history of customers and create rules and fraud detection patterns that can detect frauds, but there were issues that such patterns were not easy to create for all the possible cases and required a lot of trial and error.

In addition, there were problems that it took a lot of time to identify transactors from the transfer transaction history detected as frauds, it was difficult to compare and analyze transactions with only a tool for inquiring about transfer transaction history, and it was difficult to adjust the weight for each transfer transaction.

The terms or words used in the present description and the claims should not be construed as limited to their ordinary or lexical meanings. They should be construed as the meaning and concept in line with the technical idea of the described technology based on the principle that the inventor can define the concept of terms or words in order to describe his/her own invention in the best possible way. Further, because the embodiment described herein and the configurations illustrated in the drawings are merely one embodiment in which the described technology is realized and do not represent all the technical ideas of the described technology, it should be understood that there may be various equivalents, variations, and applicable examples that can replace them at the time of filing this application.

Although terms such as first, second, A, B, etc. used in the present description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the described technology. The term 'and/or' includes a combination of a plurality of related listed items or any item of the plurality of related listed items.

The terms used in the present description and the claims are merely used to describe particular embodiments and are not intended to limit the described technology. Singular expressions include plural expressions unless the context explicitly indicates otherwise. In the present application, terms such as "comprise," "have," etc. should be understood as not precluding the possibility of existence or addition of features, numbers, steps, operations, components, parts, or combinations thereof described herein.

Unless defined otherwise, all terms used herein, including technical or scientific terms, have the same meaning as commonly understood by those of ordinary skill in the art to which the described technology pertains.

Terms such as those defined in commonly used dictionaries should be construed as having a meaning consistent with the meaning in the context of the relevant art, and are not to be construed in an ideal or excessively formal sense unless explicitly defined in the present application.

In addition, each configuration, procedure, process, method, or the like included in each embodiment of the described technology may be shared to the extent that they are not technically contradictory to each other.

Hereinafter, fraud detection methods and systems in accordance with some embodiments of the described technology will be discussed with reference to FIGS. 1 to 15.

Figure 2:
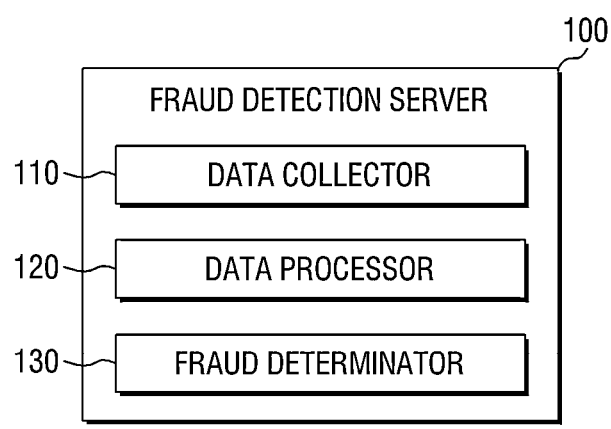
FIG. 2 is a diagram for describing the fraud detection server of FIG. 1.

FIG. 1 is a diagram for describing a fraud detection system in accordance with some embodiments of the disclosure FIG. 2 is a diagram for describing the fraud detection server of FIG. 1.

First, referring to FIG. 1, the fraud detection system may include a fraud detection server (or an abnormal transaction data detection server computer) 100, a financial server (or an institution server computer) 200, and a communication network 300. The financial server 200 may communicate data with a plurality of user devices via a communication network that may be different from the communication network 300. The fraud detection server 100 may include a communication interface that can interact with the financial server 200 via the communication network 300.

Users can execute transfer transactions between users via the financial server 200. For example, a first user may request the financial server 200 to provide a first amount to a second user. In other words, in response to a transfer request from the first user, the financial server 200 can provide a portion of the amount deposited in the account of the first user to the account of the second user. In other words, the financial server 200 can change the data on the amounts of money deposited in the accounts of the first and second users in response to the request from the user.

The financial server 200 can store transaction data on transfer transactions between users. For example, the financial server 200 can store data on the first user who has requested the transfer of the first amount, data on the second user who has received the first amount, and data on the first amount. In other words, the financial server 200 can store personal name data serving as the target of a transfer transaction and data on a transfer transaction amount.

On the other hand, the communication network 300 may play the role of connecting the fraud detection server 100 and the financial server 200. That is, the communication network 300 may provide a connection path so as to connect the fraud detection server 100 and the financial server 200 and then to transmit and receive data. The communication network 300 may encompass wired networks such as for example, LANs (Local Area Networks), WANs (Wide Area Networks), MANs (Metropolitan Area Networks), ISDNs (Integrated Service Digital Networks), or wireless networks such as wireless LANs, CDMA, Bluetooth, satellite communication, but the scope of the described technology is not limited thereto.

The fraud detection server 100 may receive a plurality of pieces of transaction data from the financial server 200 via the communication network 300. The fraud detection server 100 may determine whether there occurs a fraud by using the plurality of pieces of transaction data.

In the following, 'transaction data' is defined to include 'name data on transfer transactions' and 'transfer amount data on transfer transactions.' 'Transfer amount data' may be used interchangeably with remittance amount data or receiving amount data. This is because if a transfer transaction is based on a sender, it is remittance amount data, and if based on a recipient, it becomes receiving amount data.

In addition, 'name data' is defined to include both 'data on senders' and 'data on recipients.' In other words, 'transaction data' may include data on senders, recipients, and transfer amounts (remittance amounts or receiving amounts).

Specifically, referring to FIG. 2, the fraud detection server 100 may include a data collector (or a data collection processor) 110, a data processor 120, and a fraud determinator (or an abnormal transaction detection processor) 130.

First, the data collector 110 may request and receive a plurality of pieces of transaction data from the financial server 200. For example, the data collector 110 may request and receive a plurality of pieces of transaction data that occurred in a certain period from the financial server 200. As another example, the data collector 110 may request and receive a plurality of pieces of transaction data that occurred in a certain time slot in a certain period from the financial server 200. As yet another example, the data collector 110 may request and receive a plurality of pieces of transaction data associated with the first transactor from the financial server 200. However, these are merely some embodiments of the described technology, and the described technology is not limited thereto.

Subsequently, the data processor 120 may determine at least one piece of valid transaction data out of the plurality of pieces of transaction data received by the data collector 110 based on a predetermined criterion. Here, 'valid transaction data' is defined as at least one piece of transaction data used to detect whether a fraud has occurred in accordance with some embodiments of the described technology among the plurality of pieces of transaction data.

More specifically, the 'valid transaction data' may include personal name data that made a 'valid transaction' and the amount data on the 'valid transaction.' That is, if a first user has transferred a first amount to a second user and this action is determined to be a 'valid transaction', the data on the first user, the second user, and the first amount is 'valid transaction data.' In summary, let a significant transaction activity between users be a 'valid transaction,' then the data on these users and the data on the transaction amount can be defined as 'valid transaction data.' In other words, the 'valid transaction' can mean transfer transactions that satisfy conditions that are meaningful in the detection of frauds.

Subsequently, the data processor 120 may generate a valid transaction pattern by using the valid transaction data. In this case, the 'valid transaction pattern' may mean a pattern related to the flow in which money is transferred. The 'valid transaction pattern" may be a pattern in which the data on transfer transactions that have occurred between a plurality of users is schematized. For example, the 'valid transaction pattern' may be schematized into a diagram connecting valid transactors. However, this is merely one example of schematization, and the embodiments are not limited thereto.

The fraud determinator 130 may receive the valid transaction pattern from the data processor 120. The fraud determinator 130 may determine whether there exists a fraud in the valid transaction pattern.

For example, the fraud determinator 130 may compare a predetermined fraud pattern with the valid transaction pattern and thereby determine whether there exists a fraud exist in the valid transaction pattern. On the other hand, as another example, the fraud determinator 130 may provide the valid transaction pattern to a pre-trained deep learning module and thereby determine whether there exists a fraud in the valid transaction pattern. The details of this will be described later below.

In summary, the fraud detection server 100 in accordance with some embodiments of the described technology may derive the valid transaction data, and based on this, derive the valid transaction pattern, and using this, determine whether a fraud has occurred.

In the following, a fraud detection method that is performed by the fraud detection server 100 and that determines whether there exists a fraud will be discussed in detail, with reference to FIG. 3.

Figure 3:
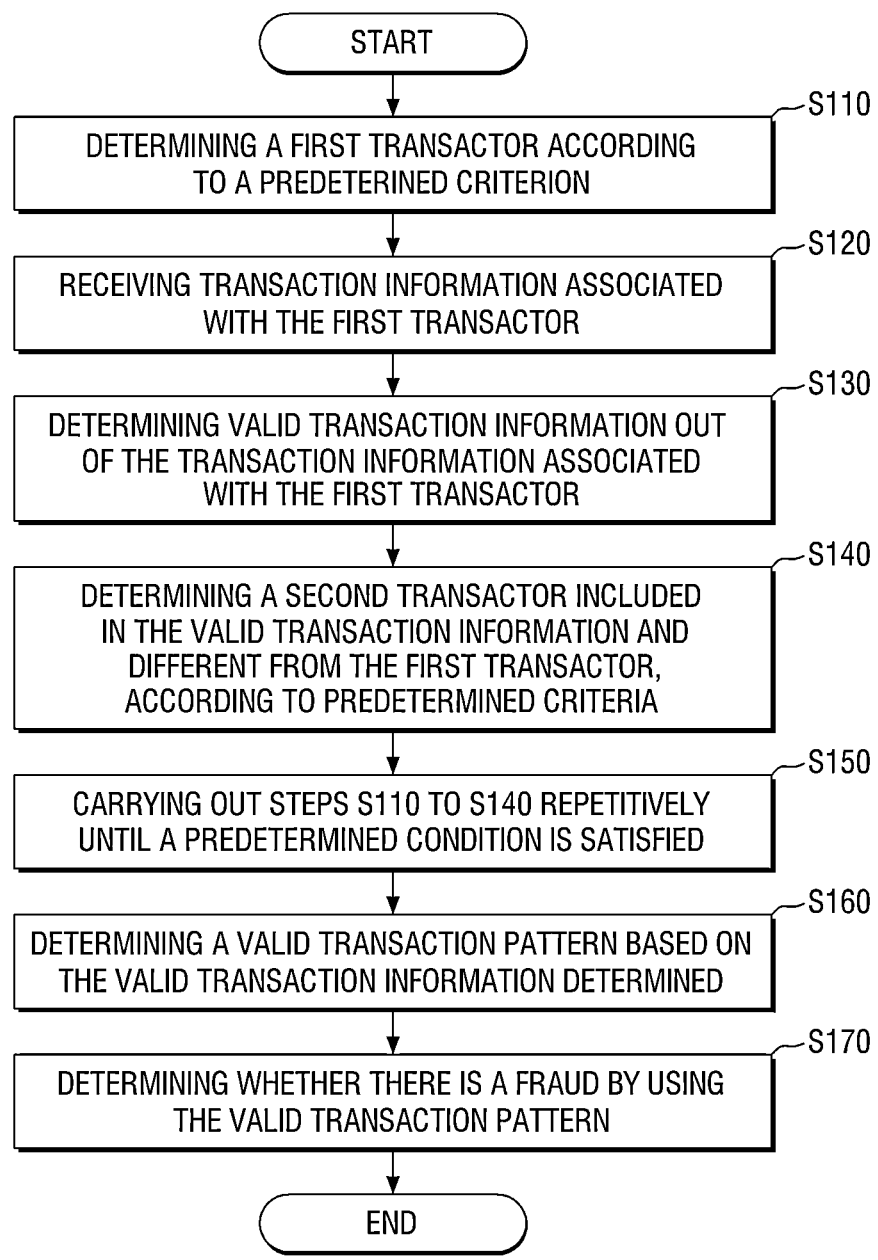
FIG. 3 is a view for describing a fraud detection method in accordance with some embodiments of the disclosure.

FIG. 3 is a view for describing a fraud detection method in accordance with some embodiments of the disclosure Hereinafter, a case in which the fraud detection method of the described technology is carried out on the fraud detection server 100 will be described as an example. However, the described technology is not limited thereto, and as a matter of course, the performing body of the fraud detection method may be variously modified and implemented.

Referring to FIG. 3, a first transactor may be determined according to a predetermined criterion (S110). In this case, the first transactor may be determined using various methods.

For example, the first transactor may be determined arbitrarily or according to an input that is provided externally. As another example, data on a person suspected of fraud may be received, and this may be determined as the first transactor. As yet another example, data on a person with a criminal record related to fraud may be received, and this may be determined as the first transactor. However, these descriptions are merely illustrative for helping to understand, and the described technology is not limited thereto.

Next, transaction data associated with the first transactor may be received (S120). Here, the transaction data associated with the first transactor may mean transaction data including the data about the first transactor. In other words, the transaction data associated with the first transactor may include data on the details of the first transactor transferring a particular amount to a third party and the details of the first transactor receiving a particular amount from a third party.

Next, valid transaction data may be determined out of the transaction data associated with the first transactor (S130). According to some embodiments, the valid transaction data may be determined based on the transaction amount data included in the transaction data. A detailed description of a method for determining the valid transaction data will be provided later below.

Next, a second transactor may be determined according to predetermined criteria. The second transactor may be included in the valid transaction data determined in step S130 and may be a transactor different from the first transactor (S140). For example, out of those included in the valid transaction data determined, a person having the highest transaction amount or a person having a higher proportion of the transaction amount than a predetermined reference value may be determined as the second transactor. However, this is merely an example for describing the criteria based on which the second transactor is determined, and the embodiments of the described technology are not limited thereto. Those of ordinary skill in the art of the described technology may determine the second transactor according to various criteria.

Next, steps S110 to S140 may be repetitively carried out until a predetermined condition is satisfied (S150). For example, the described technology may carry out steps S110 to S140 repetitively a predetermined number of times, but embodiments are not limited thereto.

Next, a valid transaction pattern may be determined (S160) based on the valid transaction data determined through steps S110 to S150. In this case, the valid transaction pattern may be a pattern in which the valid transaction data determined through steps S110 to S150 is schematized.

Next, by using the valid transaction pattern, it may be determined whether a fraud is included in the transaction data associated with the first transactor (S170). A specific description related thereto will be described in detail with reference to FIGS. 10 to 14.

In the following, a process in which the valid transaction data is determined will be illustratively described with reference to FIGS. 4 to 6.

Figure 4:
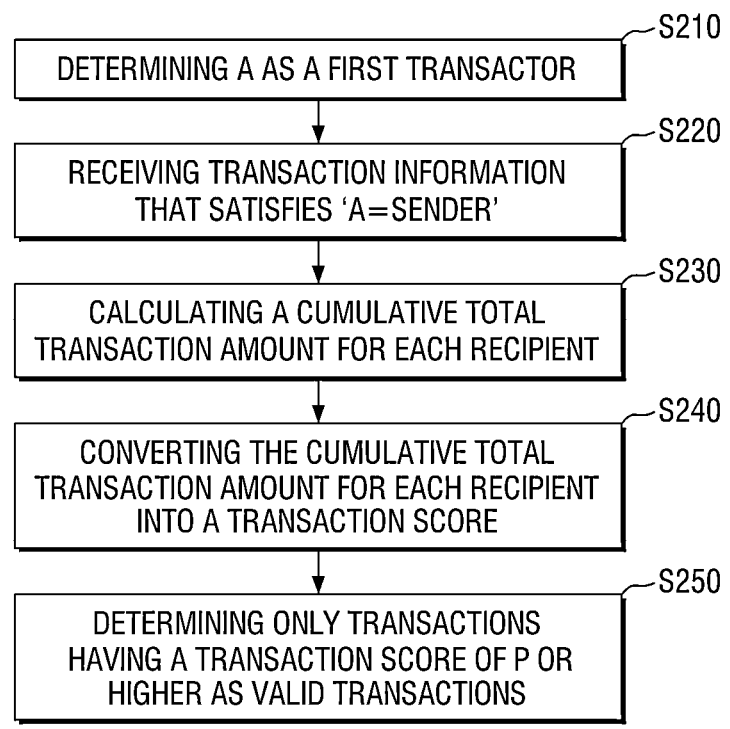
FIG. 4 is a view for illustratively describing a process of determining valid transaction data for a remittance transaction of a first transactor in accordance with some embodiments of the disclosure.

FIG. 4 is a view for illustratively describing a process of determining valid transaction data for a remittance transaction of a first transactor in accordance with some embodiments of the disclosure FIGS. 5 and 6 are patterns schematically illustrating the process of FIG. 4.

First, referring to FIG. 4, A is determined as a first transactor according to a predetermined criterion (S210).

Next, all transaction data of the cases where A is the sender is received. In other words, data on all the recipients who have received money transferred from A and data on the transaction amounts is received (S220). At this time, all transaction data related to A may be received, and out of this, the data on all the recipients who have received money transferred from A and the data on the received amounts may be determined.

Next, a cumulative total transaction amount is calculated for each recipient (S230). Here, the 'cumulative total transaction amount' refers to the total of the same transaction amounts for both the senders and the recipients.

Next, the cumulative total transaction amount calculated for each recipient is converted into a transaction score (S240). In this case, there may be various methods for converting the cumulative total transaction amount into a transaction score. The methods described below are merely illustrative, and those of ordinary skill in the art of the described technology will be able to convert the cumulative total transaction amount into a transaction score by a desired method, if necessary.

In some embodiments of the described technology, let the transaction amount data be T1 and the maximum transaction amount data be Tmax, then the transaction score Ts1 for the transaction amount data T1 may be determined by <Equation 1> or <Equation 2>.

In this case, <Equation 1> and <Equation 2> can be used by free choice in the described technology, but calculations were made using <Equation 2> in order to reduce the calculation load and reduce the deviation in some drawings of the present specification.

$$Ts1 = \frac{T1}{T\max} \qquad <\text{Equation 1}>$$

$$Ts1 = \frac{\log(T1)}{\log(T\max)} \qquad <\text{Equation 2}>$$

In this case, the maximum transaction amount data Tmax refers to the data on the largest amount out of the amount data transacted by the first transactor TR_1. In other words, the transaction with the highest amount out of the transactions of the first transactor TR_1 may become a criterion for calculating the transaction score. However, this is merely one example, and the embodiments of the described technology are not limited thereto. For example, the maximum transaction amount data may be data on a limit amount that the first transactor TR_1 can transact.

Next, any transaction having a transaction score of p or higher is determined as a valid transaction (S250). In the following, for an illustrative description of steps S210 to S250, it will be described with reference to FIGS. 5 and 6.

First, referring to FIG. 5, A is determined as the first transactor TR_1, and if there exists a transaction relationship between A and B1 but transactions have occurred multiple times, a cumulative total transaction amount for these transaction amounts is calculated.

For example, referring to <a1> of FIG. 5, A transferred KRW 10,000 to B1 through transaction 1-1 T11 at 9:00 am. Next, A transferred KRW 5,000 to B1 through transaction 1-2 T12 at 10 am. Next, A transferred KRW 3,000 to B1 through transaction 1-3 T13 at 11 am.

If a plurality of transactions has occurred between A and B1 in this way, the cumulative total transaction amount of the amounts transferred by A to B1 is determined. That is, even if A and B1 actually have a transaction relationship a plurality of times, it is assumed that A and B1 have only made one transaction (a first transaction Ts1) in detecting fraud. However, the transaction amount of the first transaction Ts1 is regarded to be KRW 18,000, which is the cumulative total transaction amount transferred in the transaction 1-1 T11, the transaction 1-2 T12, and the transaction 1-3 T13.

That is, in order to reduce the complexity of calculation, the fraud detection method in accordance with some embodiments of the described technology may consider only the sum of transaction amounts without taking factors related to transaction frequency into account. However, this is merely one embodiment, and as a matter of course, implementations can be made in the described technology by further taking factors related to transaction frequency into account.

As another example, referring to <b1> of FIG. 6, A is determined as the first transactor TR_1 and all transaction data of the cases where A is the sender is received. In other words, data about all recipients who have received money from A is determined. That is, A transferred KRW 18,000 to B1 through a first transaction Ts1, KRW 500 to B2 through a second transaction Ts2, and KRW 500 to B3 through a third transaction Ts3. In other words, first transaction amount data for the first transaction Ts1 becomes KRW 18,000, second transaction amount data for the second transaction Ts2 becomes KRW 500, and third transaction amount data for the third transaction Ts3 becomes KRW 500.

Next, referring to <b2> of FIG. 6, a first transaction score may be determined using the first transaction amount data for the first transaction Ts1. In addition, a second transaction score may be determined using the second transaction amount data for the second transaction Ts2. Similarly, a third transaction score may be determined using the third transaction amount data for the third transaction Ts3.

Here, KRW 18,000, which is the highest amount among the transactions made by A, may be maximum transaction amount data. At this time, the first transaction score for the first transaction Ts1, the second transaction score for the second transaction Ts2, and the third transaction score for the third transaction Ts3 may be determined by using the <Equation 1> or <Equation 2> mentioned above.

For example, FIG. 6 shows the results of calculating the transaction scores by using <Equation 2>, and the first to third transaction scores are 1.0, 0.63, and 0.63, respectively.

Next, referring to <b3> of FIG. 6, only transactions having a transaction score of p or higher may be determined as valid transactions. For example, assuming p=0.7, the first transaction score is 1.0, which satisfies this, and the second and third transaction scores are 0.63, which does not satisfy this. Therefore, in this case, only the first transaction Ts1 may be determined as the valid transaction ETR.

In the following, a process of determining the valid transaction data for the receiving transactions of the first transactor will be discussed as an example different from the example described above.

Figure 7:
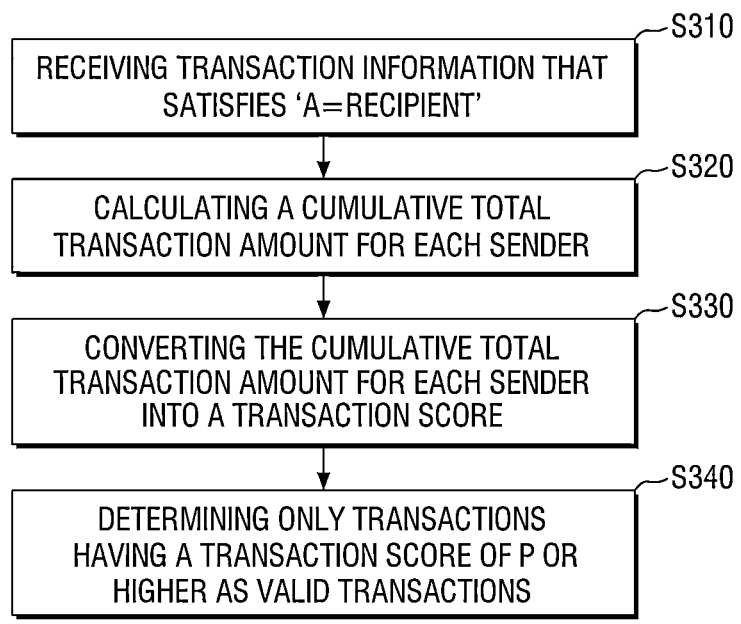
FIG. 7 is a view for illustratively describing a process of determining valid transaction data for a receiving transaction of a first transactor in accordance with some embodiments of the disclosure.

FIG. 7 is a view for illustratively describing a process of determining valid transaction data for a receiving transaction of a first transactor in accordance with some embodiments of the disclosure FIG. 8 is a pattern schematically illustrating FIG. 7. For the convenience of description, the contents overlapping with or similar to what has been described above will be omitted or described briefly.

Referring to FIG. 7, all transaction data of the cases where A is the recipient is received. In other words, data on all the senders who have transferred money to A and data on the transaction amounts is received (S310). For example, transaction data associated with A may be received, and out of this, the data on all the senders who have transferred money to A and the data on the transaction amounts may be determined.

Next, a cumulative total transaction amount is calculated for each sender (S320), and the cumulative total transaction amount calculated for each sender is converted into a transaction score (S330).

For example, referring to FIG. 8, after A has been determined as the first transactor TR_1, all transaction data of the cases where A is the recipient is received. In other words, the data on all the senders who have transferred money to A is received. That is, A has received money from C1 through a fourth transaction Ts4, and received money from C2 through a fifth transaction Ts5.

A fourth transaction score for the fourth transaction Ts4 and a fifth transaction score for the fifth transaction Ts5 may be determined.

Next, only transactions having a transaction score of p or higher may be determined as valid transactions (S340). For example, assuming p=0.7, the fourth transaction score is 1.0, which satisfies this, and the fifth transaction score is 0.16, which does not satisfy this. Therefore, in this case, only the fourth transaction Ts4 may be determined as the valid transaction ETR.

In other words, a valid transaction ETR means a transfer transaction in which a total of the transaction amounts between the sender and the recipient for a certain period exceeds a criterion. The larger the total of the transaction amounts, the more it can be determined that the sender and the recipient have a special relationship of trust, which may be converted into and expressed in terms of the transaction score described above.

The described technology can identify valid transactors for particular transactors from a plurality of pieces of transaction data based on the predefined equations described above, and can automatically identify additional valid transactors for the identified valid transactors. Next, the described technology can schematize the confidence level between valid transactors so as to be recognized at a glance by deriving a relationship between transactors based on the transaction score between a particular transactor and the valid transactors.

In the following, an example of a valid transaction pattern schematized by the fraud detection method described above will be discussed.

FIG. 9 is a diagram for illustratively describing a method of determining a valid transaction pattern in accordance with some embodiments of the disclosure Referring to <c1> of FIG. 9, A is determined as the first transactor TR_1 through the processes of FIGS. 4 to 8 described above, and a valid transaction associated with A, which is the first transactor TR_1, is determined and schematized.

Specifically, all transaction data of the cases where A is the sender may be received and thus all recipients who have received money from A may be determined. A cumulative total transaction amount for each recipient may be calculated, and a transaction score may be determined based on the cumulative total transaction amount for each recipient. Next, valid transactions may be determined based on the transaction score determined, and only the valid transactions determined may be schematized and represented.

In addition, all transaction data of the cases where A is the recipient is received, all senders who have transferred money to A may be determined. A cumulative total transaction amount for each sender may be calculated, and a transaction score may be determined based on the cumulative total transaction amount for each sender. Next, valid transactions may be determined based on the transaction score determined. For example, a transaction in which A has transferred money to B1 and a transaction in which C1 has transferred money to A are determined as valid transactions, and only the valid transactions determined may be schematized and further represented.

Next, referring to <c2> of FIG. 9, when the analysis for A, who is the first transactor TR_1, is completed, C1 who is one of the valid transactors of the first transactor TR_1 may be determined as the second transactor TR_2. At this time, the second transactor TR_2 may be included in the transaction data associated with the first transactor TR_1 and may be a transactor different from the first transactor TR_1. In other words, the second transactor TR_2 may be included in the valid transaction data but may be a different transactor from the first transactor TR_1.

Next, a valid transaction with D1 associated with C1, who is the second transactor TR_2, may be determined and schematized. In deriving the valid transaction with D1, the same process as the method described above may be repetitively performed.

Next, referring to <c3> of FIG. 9, the schematized pattern may be arranged. According to some embodiments, the schematized pattern may be arranged differently according to transaction scores between transactors. For example, the higher the trading score of two transactors, the closer the schematized positions of the two transactors may be to each other.

However, this is merely an illustrative description, and the embodiments are not limited thereto. As another example, the higher the trading score of two transactors, the thicker the arrows may be, or the positions of the two transactors may be the same regardless of the transaction scores of the two transactors.

Next, referring to <c4> of FIG. 9, when the analysis for C1, who is the second transactor TR_2, is completed, D1 may be determined as the third transactor TR_3. At this time, the third transactor TR_3 may be included in the transaction data associated with the first transactor TR_1 and/or the second transactor TR_2, and may be a transactor different from the first transactor TR_1 and the second transactor TR_2. In other words, the third transactor TR_3 may be included in the valid transaction data collected but may be a different transactor from the first transactor TR_1 and the second transactor TR_2.

Next, a valid transaction associated with D1, who is the third transactor TR_3, may be determined and schematized. A valid transaction pattern may be determined by repeating such a process according to a predetermined criterion.

Here, the predetermined criterion may refer to various criteria, such as repeating the corresponding process a predetermined number of times or repeating until a particular pattern is derived. Those of ordinary skill in the art of the described technology may select it in an appropriate method depending on the situation. Valid transactions that are repeated and schematized based on predetermined criteria become so-called 'valid transaction patterns.'

In the following, some embodiments for determining whether there is a fraud by using the valid transaction pattern derived in the method described above will be discussed in detail.

Figure 10:
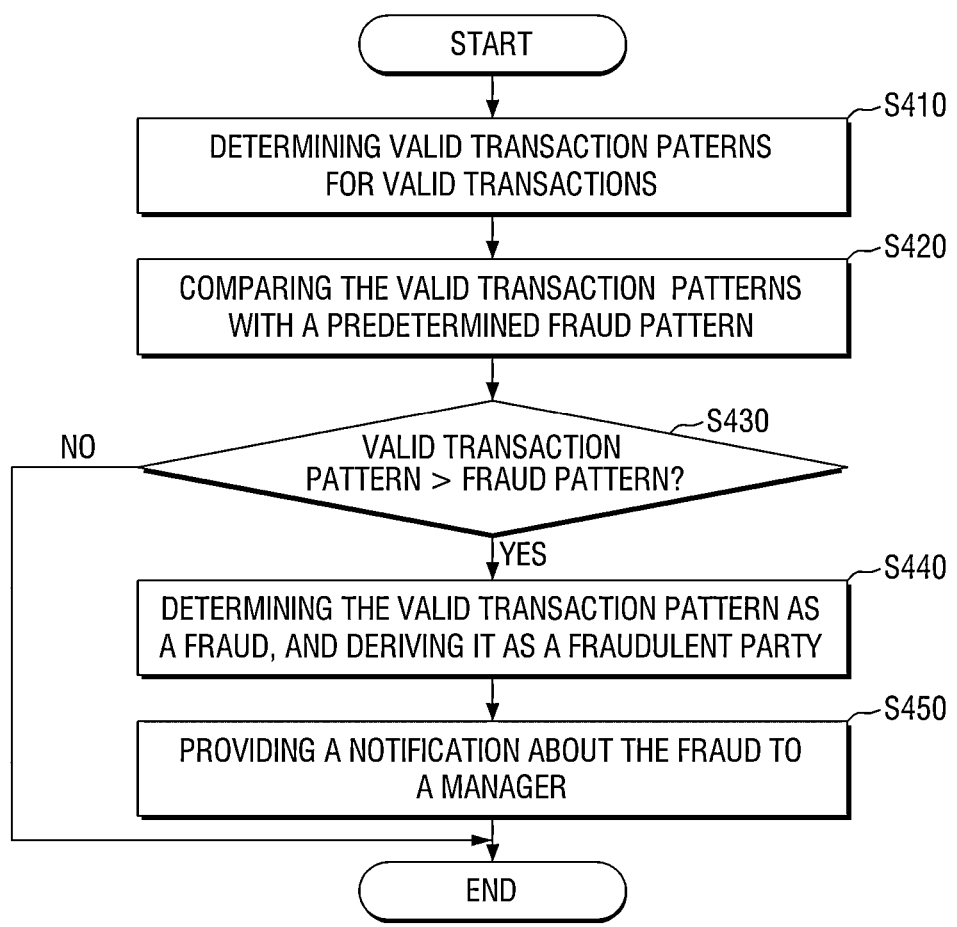
FIG. 10 is a view for illustratively describing a method of determining whether there is a fraud by comparing valid transaction patterns in the fraud detection method in accordance with one embodiment of the described technology.

FIG. 10 is a view for illustratively describing a method of determining whether there is a fraud by comparing valid transaction patterns in the fraud detection method in accordance with one embodiment of the described technology. FIG. 11 is a diagram for illustratively describing fraud patterns in accordance with some embodiments of the disclosure Referring to FIG. 10, when a valid transaction pattern for valid transactions is determined (S410), the determined valid transaction pattern and a predetermined fraud pattern are compared (S420). In order to describe an example of a predetermined fraud pattern, a reference is further made to FIG. 11.

For example, referring to <d1> of FIG. 11, G transfers a certain amount to I, and H also transfers a certain amount to I. Next, I transfers a certain amount to J and K. It can be determined that this is the case where funds regularly flow to another place through I, and <d1> can be determined as a fraud pattern.

As another example, <d2> of FIG. 11 shows that the funds held by L are divided into and transferred to M, N, O, and P, and M, N, O, and P transfer the funds held by themselves to Q. As a result, although this is no different than L transfers the funds to Q, because no direct transaction relationship between L and Q shows up, <d2> can be determined as a fraud pattern candidate.

Referring to <d3> of FIG. 11, R transfers funds to S, and S transfers funds to T. T then transfers money to various transactors including R and S. Next, T sends the funds received from R through S to a plurality of transactors, and sends profits back to R and S. Such a transaction relationship of <d3> can be determined as a fraud pattern candidate. However, FIG. 11 is merely an example where an illustrative pattern has been designed, and embodiments are not limited thereto. Actual fraud patterns may exist in a much more complex and diverse way than this.

As a matter of course, fraud patterns may be preset, stored, and used by users, or may be derived by extracting common transaction patterns from the transaction patterns determined as frauds and then be used.

Referring back to FIG. 10, it is determined whether a predetermined fraud pattern is included in the valid transaction pattern determined (S430).

Next, if the predetermined fraud pattern is included in the valid transaction pattern determined, the valid transaction pattern may be determined as a fraud pattern, and a fraudulent party may be determined (S440). In this case, the fraudulent party may be all or some of the transactors included in the fraud pattern, and as a matter of course, the method of determining the fraudulent party may be modified and implemented in various ways.

Next, a notification about the fraud may be provided to a manager (S450). Here, the 'manager' refers to a person who detects and supervises whether there is a fraud, and the manager may be the financial server 200 or may refer to a separate manager terminal (not shown).

If the preset fraud pattern is not included in the valid transaction pattern determined, the procedure for the fraud detection method may be terminated.

Through the processes described above, the fraud detection method of the described technology can detect whether a fraud is included in the valid transaction pattern by comparing the valid transaction pattern with the preset fraud pattern. Further, the described technology can solve the problem of time and manpower being excessively consumed when detecting fraud in the prior art, through automation of the derivation and comparison process for the transaction pattern, and the described technology can enhance the accuracy for detecting fraud and minimize the resources required for fraud detection by reducing the amount of computation required for detecting fraud.

On the other hand, the method of detecting a fraud based on the valid transaction pattern may be modified and implemented in various ways. In the following, a method of detecting fraud by using a pre-trained deep learning module using valid transaction patterns will be described in detail.

FIGS. 12 and 13 are views for describing a method of determining whether there is a fraud by using a deep learning module in a fraud detection method in accordance with another embodiment of the described technology. In the following, the contents overlapping with what has been described above will be omitted, and a description will be provided mainly around the differences.

Referring to FIG. 12, the fraud detection method in accordance with another embodiment of the described technology may determine whether there is a fraud by using a pre-trained deep learning module.

First, a deep learning module 131 may be trained by using training data including a transaction pattern prepared in advance and data on the presence or absence of a fraud for the corresponding transaction pattern (S510).

Referring to <e1> of FIG. 13, the transaction pattern included in the training data may be inputted to the input node of the deep learning module 131, and the presence or absence of a fraud may be inputted to the output node. In this case, the deep learning module 131 may include a plurality of layers, and a weight may be set on an edge connecting the nodes of each layer. In the training process of step S510, the weights of the nodes and the edges arranged between the input node and the output node may be updated.

Specifically, the deep learning module 131 can perform artificial neural network learning by using mapping data for separate parameters derived based on the inputted data. The deep learning module 131 can perform machine learning on the parameters inputted as learning factors. At this time, the memory of the fraud detection server 100 may store data used for machine learning, result data, and the like.

To describe in more detail, a deep learning technique, which is a kind of machine learning, goes down to a deep level in multiple stages based on data and is subjected to learning.

Deep learning refers to a set of machine learning algorithms that extract core data from a plurality of data while going up the levels.

The deep learning module 131 may use a variety of known deep learning structures. For example, the deep learning module 131 may use structures such as a convolutional neural network (CNN), a recurrent neural network (RNN), a deep belief network (DBN), or a graph neural network (GNN).

Specifically, a CNN (convolutional neural network) is a model that imitates the function of the human brain, created based on the assumption that when a person recognizes an object, s/he extracts basic features of the object, then performs complex calculations in the brain, and based on the results, recognizes the object.

An RNN (recurrent neural network) is widely used for natural language processing, etc., is a structure effective in processing time-series data that change over time, and is capable of constructing an artificial neural network structure by stacking layers at every moment.

A DBN (deep belief network) is a deep learning structure constructed by stacking a restricted Boltzmann machine (RBM), which is a deep learning technique, in multiple layers. When a certain number of layers are obtained by repeating restricted Boltzmann machine (RBM) learning, a DBN (deep belief network) having the corresponding number of layers may be constructed.

A GNN (graphic neural network; hereinafter, GNN) represents an artificial neural network structure implemented in a way that derives a similarity and feature points between modeling data, by using the modeling data modeled based on data mapped between particular parameters.

On the other hand, artificial neural network learning of the deep learning module 131 may be achieved by adjusting the weight of a connection line between nodes (and also adjusting a bias value if necessary) so that a desired output is obtained for a given input. In addition, the artificial neural network may continuously update the weight value by learning. In addition, a method such as back propagation may be used for the learning of the artificial neural network.

On the other hand, the memory (not shown) of the fraud detection server 100 may be loaded with an artificial neural network pre-trained with machine learning.

The deep learning module 131 may perform a machine learning-based fraud probability calculation operation using modeling data for the derived valid transaction pattern as input data. In this case, both semi-supervised learning and supervised learning may be used as the machine learning method of the artificial neural network. In addition, the deep learning module 131 may be controlled to automatically update the artificial neural network structure for outputting an accurate result value for the sample data in which a fraud is found according to settings.

Next, referring back to FIG. 12, the valid transaction pattern derived by the process described above is inputted to the input node of the deep learning module 131 pre-trained in step S510 (S520).

At this time, referring to <e2> of FIG. 13, the data processor 120 of the fraud detection server 100 described above may generate a valid transaction pattern derived from a particular transactor based on transaction data including transaction parties and transaction amount data. Next, the valid transaction pattern generated is inputted to the pre-trained deep learning module 131, and the deep learning module 131 outputs a fraud probability (or abnormal transaction data probability) corresponding to the inputted valid transaction pattern through the output node.

Next, it is determined whether there is a fraud with respect to the valid transaction pattern derived based on the fraud probability outputted from the deep learning module 131 (S530). Specifically, the fraud detection server 100 uses a preset reference value to thereby compare whether the outputted fraud probability is greater than the reference value.

If the fraud probability is greater than the reference value, the fraud detection server 100 may determine that the derived valid transaction pattern includes a fraud and provide the manager with a notification about the fraud.

On the other hand, if the fraud probability is less than the reference value, the fraud detection server 100 may determine it as a normal transaction in which the derived valid transaction pattern does not include a fraud. However, the method of determining whether there is a fraud by using the fraud probability is merely one example of an embodiment of the described technology, and the described technology is not limited thereto.

Through this, the fraud detection method of the described technology can perform a more accurate determination of whether there is a fraud by using the deep learning module 131, and can provide the result about this to the manager.

Moreover, although not explicitly shown in the drawings, in another embodiment of the described technology, the operation of the deep learning module 131 may be implemented in the fraud detection server 100 or a separate cloud server (not shown).

In the following, the configuration of the deep learning module 131 in accordance with the embodiment of the described technology described above will be discussed.

Figure 14:
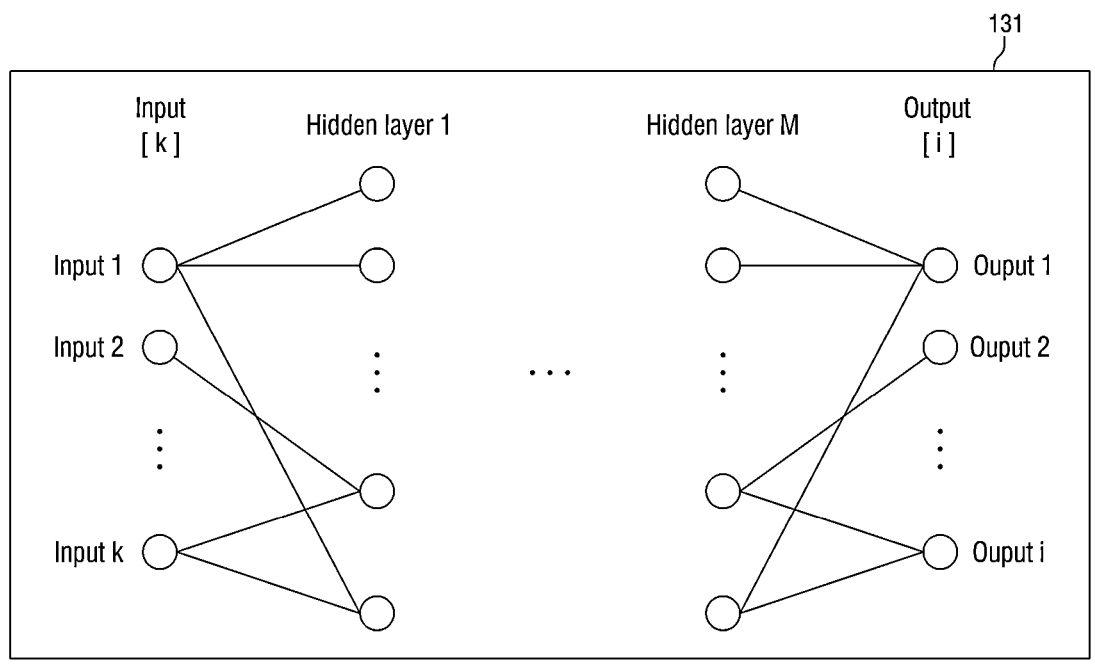
FIG. 14 is a block diagram for describing one example of the deep learning module of FIG. 13.

FIG. 14 is a block diagram for describing one example of the deep learning module of FIG. 13.

Referring to FIG. 14, the deep learning module 131 includes an input layer Input that uses the valid transaction pattern derived through the process described above as an input node, an output layer Output that uses a fraud probability of the corresponding valid transaction pattern as an output node, and M hidden layers arranged between the input layer and the output layer.

Here, weights may be set for the edges that connect the nodes of the respective layers. The presence or absence of such weights or edges may be added, removed, or updated during the training process. Therefore, the weights of the nodes and edges arranged between k input nodes and i output nodes may be updated through the training process.

Before the deep learning module 131 performs training, all nodes and edges may be set to initial values. However, if data is inputted cumulatively, the weights of the nodes and edges may be changed, and matching may be made between parameters inputted as training factors (i.e., valid transaction patterns) and values assigned to output nodes (i.e., whether there is a fraud) in this process.

Additionally, if a cloud server (not shown) is utilized, the deep learning module 131 may receive and process a large number of parameters. Therefore, the deep learning module 131 may perform training based on an immense amount of data.

The weights of the nodes and edges between the input and output nodes constituting the deep learning module 131 may be updated by the training process of the deep learning module 131. Moreover, the parameters inputted into or outputted from the deep learning module 131 may be further expanded to various data, in addition to the fraud probability, as a matter of course.

For example, the deep learning module 131 may be modified and implemented so as to directly receive transaction data including transaction parties and transaction amount data, and to output a fraud probability for the transaction data received. However, this is merely an example of one extended embodiment, and the described technology is not limited thereto.

In summary, the fraud detection method of the described technology can derive a fraud probability based on the valid transaction pattern of a particular transactor by using a deep learning module pre-trained using the training data for fraud patterns, and based on this, can quickly and easily determine whether a fraud is included in the fraud pattern.

In addition, the described technology can enhance the accuracy of determination on frauds and improve the calculation processing speed of determination on frauds by using a deep learning module trained using graphic neural networks and a valid transaction pattern derived based on the transaction data of users.

Figure 15:
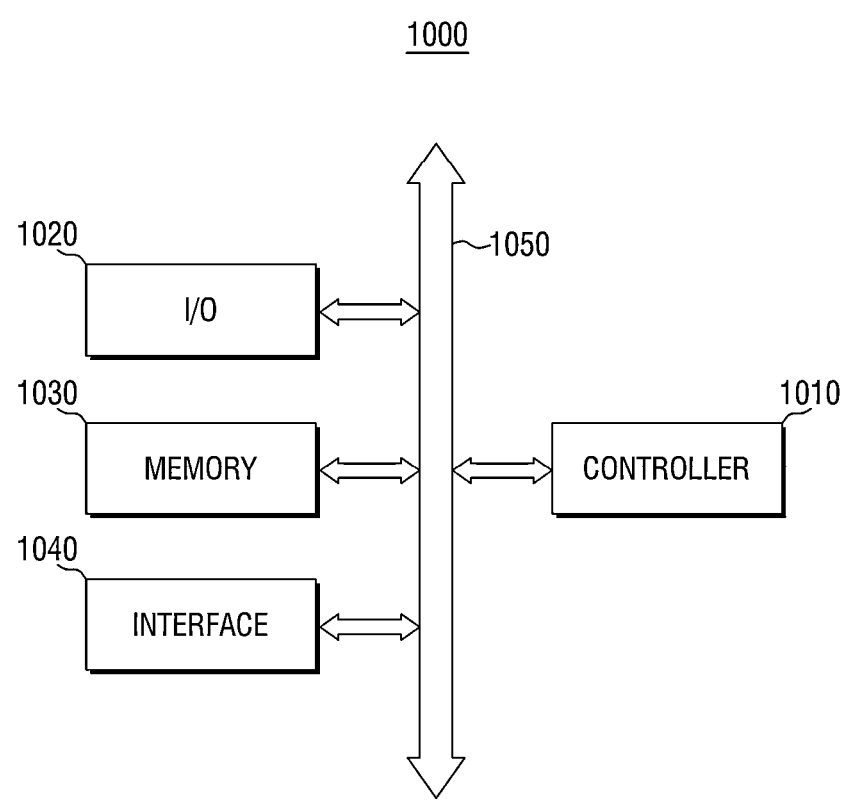
FIG. 15 is a diagram for describing a hardware implementation of a system for performing a fraud detection method in accordance with some embodiments of the disclosure.

FIG. 15 is a diagram for describing a hardware implementation of a system for performing a fraud detection method in accordance with some embodiments of the disclosure Referring to FIG. 15, a fraud detection server 100 for performing the fraud detection method in accordance with some embodiments of the described technology may be implemented with an electronic device 1000. The electronic device 1000 may include a controller 1010, an input/output device I/O 1020, a memory device 1030, an interface 1040, and a bus 1050. The controller 1010, the input/output device 1020, the memory device 1030, and/or the interface 1040 may be coupled to each other via the bus 1050. In this case, the bus 1050 corresponds to a path through which data is moved.

Specifically, the controller 1010 may include at least one of a CPU (central processing unit), an MPU (microprocessor unit), an MCU (microcontroller unit), a GPU (graphic processing unit), a microprocessor, a digital signal processor, a microcontroller, an application processor (AP), and logic devices capable of performing functions similar thereto.

The input/output device 1020 may include at least one of a keypad, a keyboard, a touch screen, and a display device.

The memory device 1030 may store data and/or a program, etc.

The interface 1040 may perform the function of transmitting data to a communication network or receiving data from the communication network. The interface 1040 may be of a wired or wireless form. For example, the interface 1040 may include an antenna or a wired/wireless transceiver. Although not shown, the memory device 1030 may be a working memory for improving the operation of the controller 1010, which may further include a high-speed DRAM and/or SRAM, etc. The memory device 1030 may store a program or an application therein.

The fraud detection server 100 and the financial server 200 in accordance with embodiments of the described technology may each be a system formed by connecting a plurality of electronic devices 1000 to each other via a network. In such a case, each module or combinations of modules may be implemented with the electronic device 1000. However, the embodiment of the disclosure is not limited thereto.

Additionally, the fraud detection server 100 may be implemented with at least one of a workstation, a data center, an Internet data center (IDC), a direct-attached storage (DAS) system, a storage area network (SAN) system, a network-attached storage (NAS) system, a RAID (redundant array of inexpensive disks, or redundant array of independent disks) system, and an EDMS (electronic document management system), but the embodiment of the disclosure is not limited thereto.

Also, the fraud detection server 100 may transmit data to the financial server 200 through a network. The network may include a network based on wired Internet technology, wireless Internet technology, and short-range communication technology. The wired Internet technology may include, for example, at least one of a local area network (LAN) and a wide area network (WAN).

The wireless Internet technology may include at least one of, for example, wireless LAN (WLAN), DMNA (Digital Living Network Alliance), WiBro Wireless Broadband), WiMAX (World Interoperability for Microwave Access), HSDPA (High Speed Downlink Packet) Access), HSUPA (High Speed Uplink Packet Access), IEEE 802.16, LTE (Long Term Evolution), LTE-A (Long Term Evolution-Advanced), WMBS (Wireless Mobile Broadband Service), and 5G NR (New Radio) technology. However, the embodiment of the disclosure is not limited thereto.

The short-range communication technology may include at least one of, for example, Bluetooth, RFID (Radio Frequency Identification), IrDA (Infrared Data Association), UWB (Ultra-Wideband), ZigBee, NFC (Near Field Communication), USC (Ultra Sound Communication), VLC (Visible Light Communication), Wi-Fi, Wi-Fi Direct, and 5G NR (New Radio). However, the embodiment of the disclosure is not limited thereto.

The fraud detection server 100 communicating over the network may comply with technical standards and standard communication methods for mobile communication. For example, the standard communication methods may include at least one of GSM (Global System for Mobile communication), CDMA (Code Division Multiple Access), CDMA 2000 (Code Division Multiple Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTEA (Long Term Evolution-Advanced), and 5G NR (New Radio). However, the embodiment of the disclosure is not limited thereto.

The above description is merely an illustrative description of the technical idea of the embodiment of the disclosures, and those of ordinary skill in the art to which the embodiment of the disclosures pertain will be able to make various modifications and variations without departing from the essential characteristics of the embodiments. Therefore, the embodiment of the disclosures are not intended to limit the technical idea of the embodiment of the disclosures but to describe it, and the scope of the technical idea of the embodiment of the disclosures is not limited by these embodiments. The scope of protection of the embodiment of the disclosures should be construed by the accompanying claims, and all technical ideas within the scope equivalent thereto should be construed as being included in the scope of the embodiment of the disclosures.

What is claimed is:

1. A system for detecting an abnormal transaction data between computing devices in a communication network, the system comprising:
    a communication interface configured to interact with an institution server computer via a first communication network, the institution server computer configured to communicate data with a plurality of user devices via a second communication network;
    a data collection processor configured to receive, from the institution server computer, a plurality of pieces of transaction data communicated between two or more of the plurality of user devices, the plurality of pieces of transaction data comprising first transaction data including first personal name data and first transaction amount data associated with the first personal name data;
    a data processor configured to:
        identify a first user from the first transaction data,
        determine first valid transaction data, involving the first user, from the first transaction data,
        identify a second user, from among candidate users associated with the first valid transaction data, the second user being different from the first user,
        determine second valid transaction data, involving the second user, different from the first valid transaction data, the second valid transaction data being directly or indirectly derived from the first user,
        identify a third user, from among candidate users associated with the second valid transaction data, the third user being different from the first user and the second user, and
        generate a valid transaction pattern based on the first valid transaction data and the second valid transaction data; and
    an abnormal transaction detection processor configured to detect an existence of an abnormal transaction data based on the generated valid transaction pattern,
    wherein the data processor is configured to generate the valid transaction pattern based on the first valid transaction data and the second valid transaction data by:
        determining a first user device of the plurality of user devices associated with the first user,
        determining at least one transaction data transmitted by the first user device that satisfies a predetermined criterion from the first transaction data associated with the first user as the first valid transaction data, and
        determining a second user device of the plurality of user devices associated with the second user,
        determining at least one transaction data transmitted by the second user device that satisfies the predetermined criterion from second transaction data associated with the second user as the second valid transaction data,
        determining a third user device of the plurality of user devices associated with the third user, and
        generating a schematized pattern from the first valid transaction data and the second valid transaction data, wherein the valid transaction pattern comprises the schematized pattern,
    wherein, to determine the first valid transaction data, the data processor is configured to:
        generate a first transaction score based on the first transaction amount data, and
        determine the first transaction data as the first valid transaction data in response to determining that the first transaction score is greater than or equal to a predetermined reference value, and wherein, to generate the first transaction score, the data processor is configured to:

determine a largest transaction amount data from the first transaction amount data associated with the first personal name data as first maximum transaction amount data, and generate the first transaction score by using the first maximum transaction amount data and the first transaction amount data, and wherein the abnormal transaction data detection processor is configured to:

detect the existence of the abnormal transaction data in one or more of the first user device, the second user device, or the third user device based on the generated valid transaction pattern including a predetermined fraud pattern, and transmit a notification of the detected existence of the abnormal transaction data to at least one of the institution server computer or a manager terminal such that one or more transactions, associated with the detected existence of the abnormal transaction data, among two or more of the first user device, the second user device, or the third user device are blocked.

2. The system of claim 1, wherein the data processor is configured to generate the first transaction score using one of <Equation 1> or <Equation 2> expressed by:

<Equation 1>

$$Ts1 = \frac{T1}{T\max}$$

<Equation 2>

$$Ts1 = \frac{\log(T1)}{\log(T\max)}$$

where Ts1 is the first transaction score, T1 is the first transaction amount data, and Tmax is the first maximum transaction amount data.

3. The system of claim 1, wherein the abnormal transaction detection processor is configured to detect the existence of the abnormal transaction data by deriving an abnormal transaction data probability indicating a probability that an abnormal transaction data will occur with respect to the valid transaction pattern by using a pre-trained deep learning module, based on the valid transaction pattern.

4. The system of claim 3, wherein the deep learning module comprises:

an input layer capable of using data related to the valid transaction pattern as an input node;

an output layer capable of using the abnormal transaction data probability as an output node; and one or more hidden layers arranged between the input layer and the output layer, wherein the deep learning module is configured to update weights of nodes and edges between the input node and the output node.

5. A method of detecting an abnormal transaction data between computing devices in a communication network, the method comprising:

interacting, at a communication interface, with an institution server computer via a first communication network, the institution server computer communicating data with a plurality of user devices via a second communication network;

receiving, at a data collection processor, from the institution server computer, a plurality of pieces of transaction data communicated between two or more of the plurality of user devices, the plurality of pieces of transaction data comprising first transaction data including first personal name data and first transaction amount data associated with the first personal name data;

identifying, at a data processor, a first user from the first transaction data;

determining, at the data processor, first valid transaction data, involving the first user, from the first transaction data;

identifying, at the data processor, a second user, from among candidate users associated with the first valid transaction data, the second user being different from the first user;

determining, at the data processor, second valid transaction data, involving the second user, different from the first valid transaction data, the second valid transaction data being directly or indirectly derived from the first user;

identifying, at the data processor, a third user, from among candidate users associated with the second valid transaction data, the third user being different from the first user and the second user;

generating, at the data processor, a valid transaction pattern based on the first valid transaction data and the second valid transaction data; and detecting, at an abnormal transaction detection processor, an existence of an abnormal transaction data based on the generated valid transaction pattern, wherein generating the valid transaction pattern comprises:

determining a first user device of the plurality of user devices associated with the first user, determining at least one transaction data transmitted by the first user device that satisfies a predetermined criterion from the first transaction data as the first valid transaction data, determining a second user device of the plurality of user devices associated with the second user, determining at least one transaction data transmitted by the second user device that satisfies the predetermined criterion from the second transaction data as the second valid transaction data, determining a third user device of the plurality of user devices associated with the third user, and generating a schematized pattern from the first valid transaction data and the second valid transaction data, wherein the valid transaction pattern comprises the schematized pattern, wherein determining the first valid transaction data comprises:

generating a first transaction score based on the first transaction amount data, and determining the first transaction data as the first valid transaction data in response to determining that the first transaction score is greater than or equal to a predetermined reference value, and wherein generating the first transaction score comprises:
determining a largest transaction amount data from the first transaction amount data associated with the first personal name data as first maximum transaction amount data, and generating the first transaction score by using the first maximum transaction amount data and the first transaction amount data, and wherein the method further comprises:
detecting the existence of the abnormal transaction data in one or more of the first user device, the second user device, or the third user device based on the generated valid transaction pattern including a predetermined fraud pattern, and transmitting a notification of the detected existence of the abnormal transaction data to at least one of the institution server computer or a manager terminal such that one or more transactions, associated with the detected existence of the abnormal transaction data, among two or more of the first user device, the second user device, or the third user device are blocked.

6. The method of claim 5, wherein the first transaction score is derived by one of <Equation 1> or <Equation 2> expressed by:

<Equation 1>

$$Ts1 = \frac{T1}{T\max}$$

<Equation 2>

$$Ts1 = \frac{\log(T1)}{\log(T\max)}$$

where Ts1 is the first transaction score, T1 is the first transaction amount data, and Tmax is the first maximum transaction amount data.

7. The method of claim 5, wherein the first personal name data comprises data of a first sender and a first recipient of the first transaction data, and
wherein the first transaction amount data corresponds to a cumulative total of amounts transferred by the first sender to the first recipient.

8. The method of claim 5, wherein the existence of the abnormal transaction data is determined based on comparison of the valid transaction pattern and a predetermined abnormal transaction pattern.

9. The method of claim 5, wherein determining the existence of the abnormal transaction data comprises:
deriving an abnormal transaction data probability indicating a probability that an abnormal transaction data will occur with respect to the valid transaction pattern by using a pre-trained deep learning module, based on the valid transaction pattern.

10. The method of claim 9, wherein the notification is transmitted to at least one of the institution server computer or the manager terminal in response to determining that the abnormal transaction data probability is higher than the predetermined reference value.

11. The method of claim 9, wherein the deep learning module comprises:
an input layer capable of using data related to the valid transaction pattern as an input node;
an output layer capable of using the abnormal transaction data probability as an output node; and
one or more hidden layers arranged between the input layer and the output layer,
wherein weights of nodes and edges between the input node and the output node are updated by a training process of the deep learning module.

12. The method of claim 9, wherein the deep learning module derives modeling data most similar to the inputted valid transaction pattern by using graphic neural networks, and outputs the abnormal transaction data probability based on the derived modeling data.

13. A non-transitory computer-readable recording medium storing instructions, when executed by one or more processors, causing the one or more processors to perform the method of claim 5.

14. The system of claim 1, wherein the data processor is configured to identify the first user, the second user, and the third user, based on a relationship that:
the second user directly communicates the first valid transaction data with the first user, and
the third user directly communicates the second valid transaction data with the second user and indirectly communicates the second valid transaction data with the first user.

15. The system of claim 1, wherein the data processor is configured to repeat multiple times i) identifying the first user, ii) determining the first valid transaction data, iii) identifying the second user, iv) determining the second valid transaction data, and v) identifying the third user, until a predetermined condition is satisfied.

16. The system of claim 1, wherein the abnormal transaction data detection processor is configured to detect the existence of the abnormal transaction data based on a deep learning module trained by using training data including a transaction pattern prepared in advance and data on the presence or absence of a fraud for the corresponding transaction pattern,
wherein the deep learning module is configured to:
receive the valid transaction pattern as an input thereto, and
output a fraud probability corresponding to the received valid transaction pattern, and
wherein the abnormal transaction data detection processor is configured to:
compare the fraud probability output from the deep learning module with a preset reference value, and
detect the existence of the abnormal transaction data based on the fraud probability being greater than the preset reference value.

* * * * *